(12) United States Patent
Kuroda

(10) Patent No.: US 10,518,338 B2
(45) Date of Patent: Dec. 31, 2019

(54) END MILL AND METHOD OF MANUFACTURING MACHINED PRODUCT

(71) Applicant: Kyocera Corporation, Kyoto-shi, Kyoto (JP)

(72) Inventor: Masahiko Kuroda, Higashiomi (JP)

(73) Assignee: Kyocera Corporation, Kyoto-shi, Kyoto (JP)

(*) Notice: Subject to any disclaimer, the term of this patent is extended or adjusted under 35 U.S.C. 154(b) by 0 days.

(21) Appl. No.: 15/755,583

(22) PCT Filed: Aug. 29, 2016

(86) PCT No.: PCT/JP2016/075190
§ 371 (c)(1),
(2) Date: Feb. 27, 2018

(87) PCT Pub. No.: WO2017/038763
PCT Pub. Date: Mar. 9, 2017

(65) Prior Publication Data
US 2018/0250757 A1    Sep. 6, 2018

(30) Foreign Application Priority Data
Aug. 28, 2015  (JP) ................. 2015-169296

(51) Int. Cl.
*B23C 5/10*         (2006.01)
(52) U.S. Cl.
CPC .............. *B23C 5/1009* (2013.01); *B23C 5/10* (2013.01); *B23C 2210/0435* (2013.01);
(Continued)

(58) Field of Classification Search
CPC .... B23C 2210/0435; B23C 2210/0485; B23C 2210/40; B23C 2210/54; B23C 5/10;
(Continued)

(56) References Cited

U.S. PATENT DOCUMENTS

2001/0041104 A1* 11/2001 Church ................. B23C 5/10
                                                        407/34
2002/0031409 A1*  3/2002 Sato .................... B23C 5/10
                                                        407/53
(Continued)

FOREIGN PATENT DOCUMENTS

JP        62188616 A  *  8/1987  ............ B23B 51/02
JP      2006000985 A      1/2006
(Continued)

OTHER PUBLICATIONS

International Search Report received for International Application No. PCT/JP2016/075190 dated Nov. 15, 2016, 1 page.

*Primary Examiner* — Sara Addisu
(74) *Attorney, Agent, or Firm* — Viering, Jentschura & Partner MBB

(57) ABSTRACT

An end mill includes a bar-shaped body, a cutting edge, a gash, a first flute, and a second flute. The body extends from a first end to a second end along a rotation axis. The cutting edge is located at a side of the first end of the body. The gash is located adjacent to the cutting edge. The first flute surrounds the gash and spirally extends from the gash toward the second end. The second flute surrounds the first flute and spirally extends from the first flute toward the second end. A depth of the first flute is greater than a depth of the second flute in a cross section orthogonal to the rotation axis.

19 Claims, 9 Drawing Sheets

(52) U.S. Cl.
CPC .. *B23C 2210/0485* (2013.01); *B23C 2210/40* (2013.01); *B23C 2210/54* (2013.01)

(58) Field of Classification Search
CPC ............ B23C 5/1009; B23C 2210/405; B23C 2210/202; B23C 2210/285
See application file for complete search history.

(56) References Cited

U.S. PATENT DOCUMENTS

| | | | | |
|---|---|---|---|---|
| 2003/0118411 A1* | 6/2003 | Flynn | ........................ | B23C 5/10 407/53 |
| 2006/0067797 A1* | 3/2006 | Calamia | .................... | B23C 5/10 407/53 |
| 2013/0071192 A1* | 3/2013 | Kuroda | .................... | B23C 5/10 407/54 |
| 2016/0082526 A1 | 3/2016 | Swift et al. | | |
| 2017/0326655 A1* | 11/2017 | Kuroda | .................... | B23C 5/10 |

FOREIGN PATENT DOCUMENTS

| | | | | |
|---|---|---|---|---|
| JP | 2015080844 A | 4/2015 | | |
| WO | WO-2014069265 A1 * | 5/2014 | ............... | B23C 5/10 |
| WO | 2016158664 A1 | 10/2016 | | |

\* cited by examiner

END MILL AND METHOD OF MANUFACTURING MACHINED PRODUCT

RELATED APPLICATIONS

The present application is a national stage entry according to 35 U.S.C. § 371 of PCT application No.: PCT/JP2016/075190 filed on Aug. 29, 2016, which claims priority from Japanese application No.: 2015-169296 filed on Aug. 28, 2015 and is incorporated herein by reference in its entirety.

TECHNICAL FIELD

The present embodiment relates to an end mill and a method of manufacturing a machined product.

BACKGROUND ART

Although an end mill is used, for example, in a grooving process and a shouldering process of a workpiece, it is necessary to smoothly discharge chips generated by cutting off. For this purpose, chip discharge performance is improved by forming a chip discharge flute between a plurality of outer peripheral cutting edges. For example, as illustrated in Japanese Unexamined Patent Publication No. 2015-080844 (Patent Document 1), a gash for forming a bottom cutting edge is disposed at a front end side of the chip discharge flute in the end mill.

However, a chip discharge state of the grooving process differs from that of the shouldering process. Particularly, in the grooving process in which a large amount of chips are generated, chip clogging may occur. When the chip discharge flute is made deeper, a core thickness of an end mill body decreases, and rigidity of the end mill body is lowered. Therefore, in the shouldering process subjected to a large resistance exerted in a direction orthogonal to a rotation axis of the end mill body, the end mill body may significantly bend, and machining accuracy of the end mill may be lowered.

SUMMARY

In an embodiment, an end mill includes a body, a cutting edge, a gash, a first flute, and a second flute. The body is a bar-shaped body extending from a first end to a second end along a rotation axis. The cutting edge is located at a side of the first end of the body. The gash is located adjacent to the cutting edge. The first flute surrounds the gash and spirally extends from the gash toward the second end. The second flute surrounds the first flute and spirally extends from the first flute toward the second end. A depth of the first flute is greater than a depth of the second flute in a cross section orthogonal to the rotation axis.

EMBODIMENTS

Figure 1:
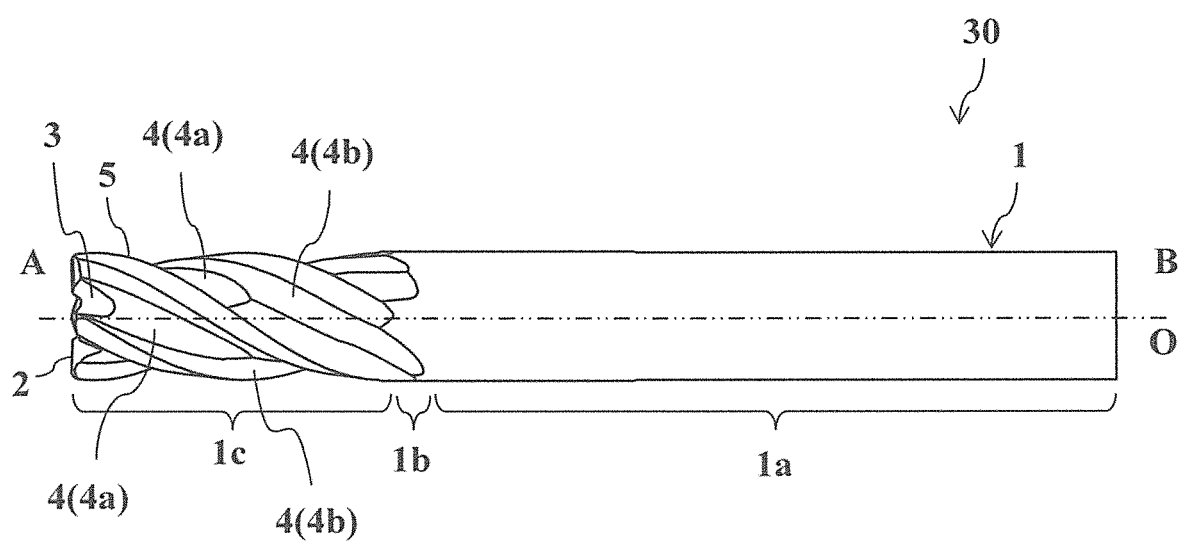
FIG. 1 is a side view illustrating an end mill in an embodiment.

An end mill 30 illustrated in FIG. 1 is a solid end mill and includes a body 1, a first cutting edge 2, a gash 3, a first flute 4a, and a second flute 4b. The body 1 is a bar-shaped body extending from a first end A to a second end B along a rotation axis O. The first cutting edge 2 is located at a side of the first end A of the body 1. The gash 3 is located adjacent to the first cutting edge 2. The first flute 4a surrounds the gash 3 and extends spirally from the gash 3 toward the second end B of the body 1. The second flute 4b surrounds the first flute 4a and extends from the first flute 4a toward the second end B of the body 1.

Figure 5:
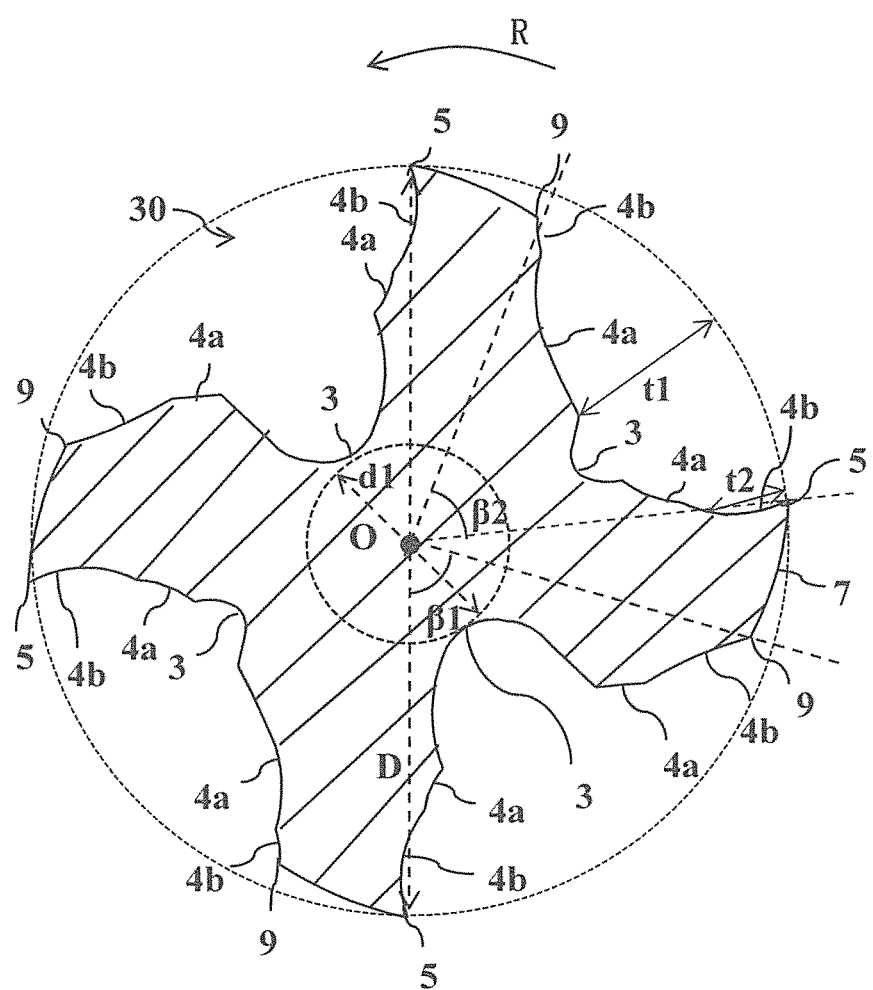
FIG. 5 is a sectional view of the end mill illustrated in FIG. 2, taken along line X-X.

As illustrated in FIG. 5, the body 1 in the present embodiment is a bar-shaped body which has a diameter D around the rotation axis O and extends from the first end A to the second end B along the rotation axis O. Accordingly, the body 1 is an approximately columnar shaped body. The rotation axis O is indicated by a two-dot chain line in FIG. 1 and the like. A part of the body 1, at which at least the first cutting edge 2 is located, is composed of a hard material, such as cemented carbide, cermet, or cBN.

Figure 6:
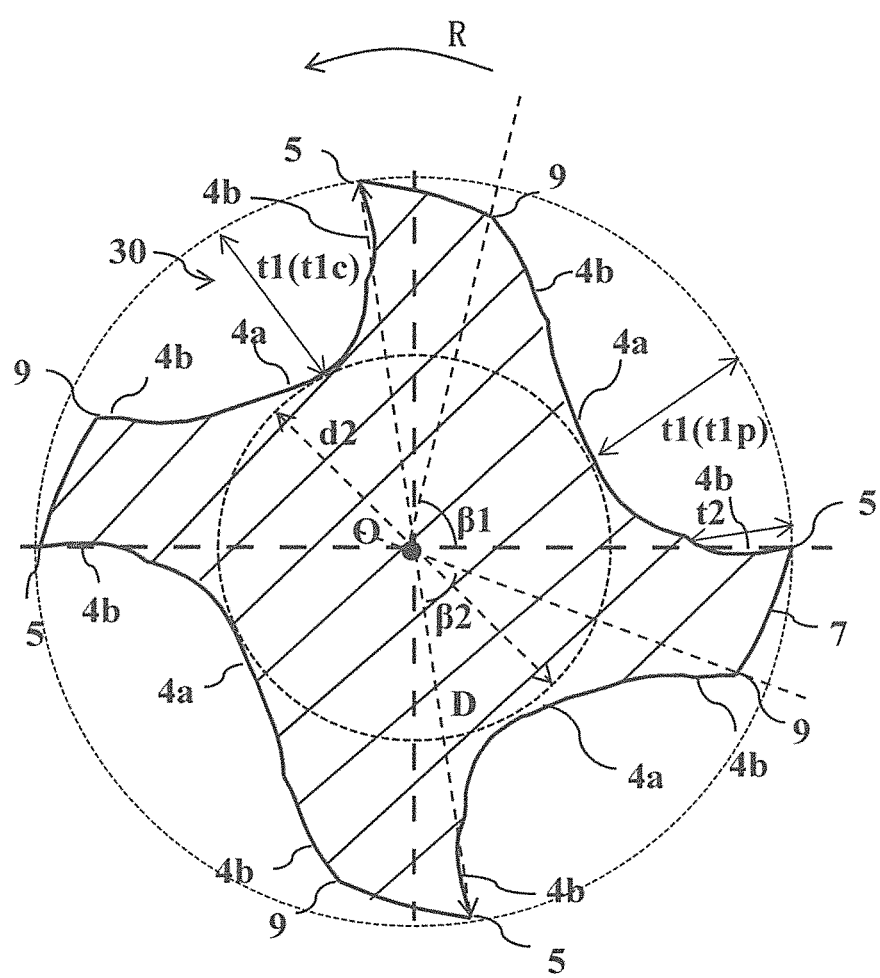
FIG. 6 is a sectional view of the end mill illustrated in FIG. 2, taken along line Y-Y.
Figure 7:
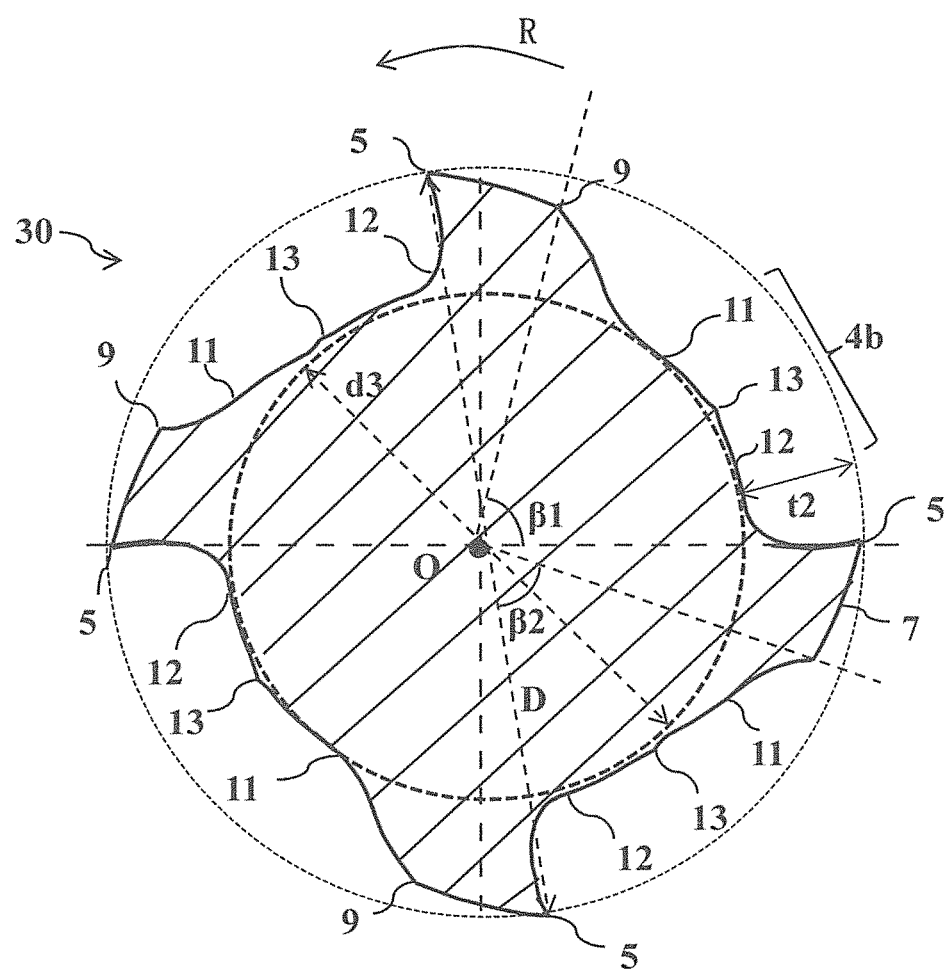
FIG. 7 is a sectional view of the end mill illustrated in FIG. 2, taken along line Z-Z.

As illustrated in FIG. 1, the body 1 is made up of a shank part 1a located at a side of the second end B, a root part 1b located at a side of the first end A with respect to the shank part 1a, and a cutting edge part 1c located at a side of the first end A with respect to the root part 1b. Core thicknesses d1 to d3 of the body 1 may increase toward a side of the second end ($d1<d2<d3$) as illustrated in FIGS. 5 to 7. The body 1 is less likely to bend when this configuration is fulfilled.

Figure 4:
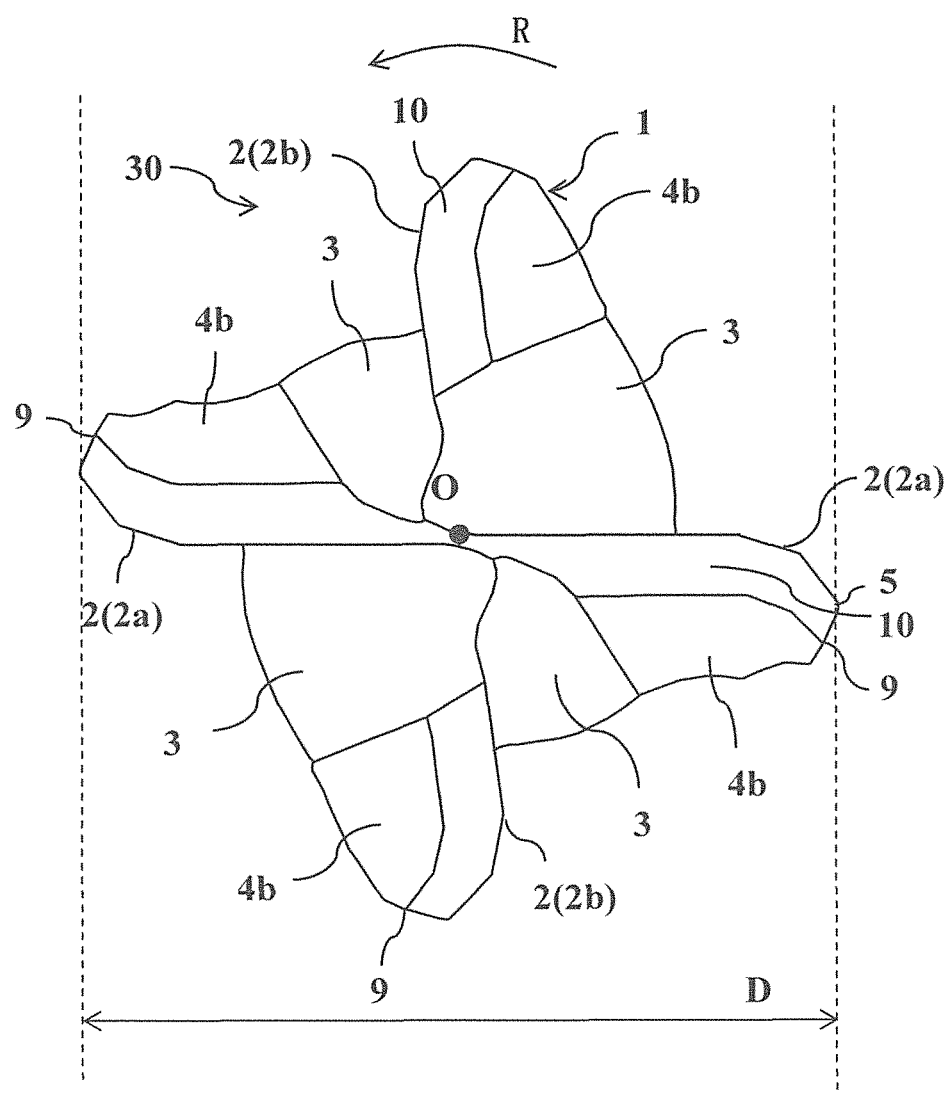
FIG. 4 is a schematic diagram when the end mill illustrated in FIG. 1 is viewed toward the first end.

The end mill 30 in the present embodiment includes the first cutting edge 2. The first cutting edge 2 is a member located at a side of the first end A in the body 1, and is generally referred to as a bottom cutting edge. Only one or a plurality of first cutting edges 2 may be included. The end mill 30 in the present embodiment includes four first cutting edges 2 as illustrated in FIG. 4.

The end mill 30 in the present embodiment also includes the second cutting edge 5 in addition to the first cutting edge 2. The second cutting edge 5 is a member located on an outer periphery of the body 1, and is generally referred to as an outer peripheral cutting edge. The second cutting edge 5 connects to an end portion at an outer peripheral side of the first cutting edge 2. The four first cutting edges 2 exit and accordingly four second cutting edges 5 also exist in the present embodiment.

Each of the second cutting edges 5 extends from the first cutting edge 2 toward a side of the second end B. A length of the second cutting edge 5 along the rotation axis O is indicated as a cutting edge length L in FIGS. 2 and 3. The second cutting edge 5 is twisted at a helix angle $\alpha 3$ with respect to the rotation axis O, and is located spirally on the outer periphery of the body 1. The first cutting edge 2 and the second cutting edge 5 may be smoothly adjacent to each other. A cutting edge is made up of the first cutting edge 2 and the second cutting edge 5.

The gash 3 is located adjacent to each of the first cutting edge 2. The gash 3 is located at the region described above, thus leading to formation of a rake surface 6 along the first cutting edge 2. The rake surface 6 in the present embodiment has a flat surface shape.

The first flute 4a surrounds the gash 3 and extends spirally from the gash 3 toward the second end B. Here, the first flute 4a does not surround entirely a circumference of the gash 3, but surrounds a range except for a part of the gash 3 which is located along the first cutting edge 2.

The second flute 4b surrounds the first flute 4a and extends spirally from the first flute 4a toward the second end B. Here, the second flute 4b does not surround entirely a circumference of the first flute 4a, but surrounds a range except for a part of the first end A which is located at a side of the first end A. The second flute 4b extends from the first flute 4a toward the second end B, and therefore extends longer toward a side of the second end B than the first flute 4a.

Thus, the end mill 30 in the present embodiment includes the first flute 4a and the second flute 4b as the flute 4 that permits discharge of chips. The flute 4 in the present embodiment includes a member 4c which is located at a side of the first end A and provided with the first flute 4a and the second flute 4b, and a member 4d which is located at a side of the second end B and provided only with the second flute 4b.

As illustrated in FIGS. 5 and 6, a depth t1 of the first flute 4a is greater than a depth t2 of the second flute 4b in a cross section orthogonal to the rotation axis O in the present embodiment. This makes it possible to suitably carry out a cutting process in both the grooving process and the shouldering process that differ in machining situation.

Specifically, a large amount of chips is apt to occur at the first cutting edge 2 in the grooving process. However, the first flute 4a having a relatively great depth exists at the member 4c and thus increases the capacity of chips, so that the chips are less likely to be caught up. A resistance exerted in the direction orthogonal to the rotation axis O is apt to increase in the shouldering process. However, the first flute 4a having the relatively great depth does not exist at the member 4d, but only the second flute 4b exists there as the flute 4. Therefore, the end mill 30, which has high rigidity, is less subjected to bending and fracture.

As used herein, the depth of the flute 4 in the present embodiment denotes a depth from a circumscribed circle of the body 1 to a bottom of each of the first flute 4a and the second flute 4b in sectional views illustrated in FIGS. 5 to 7. The depth t1 of the first flute 4a is indicated as t1, and the depth of the second flute 4b is indicated as t2 in FIGS. 5 to 7.

Figure 2:
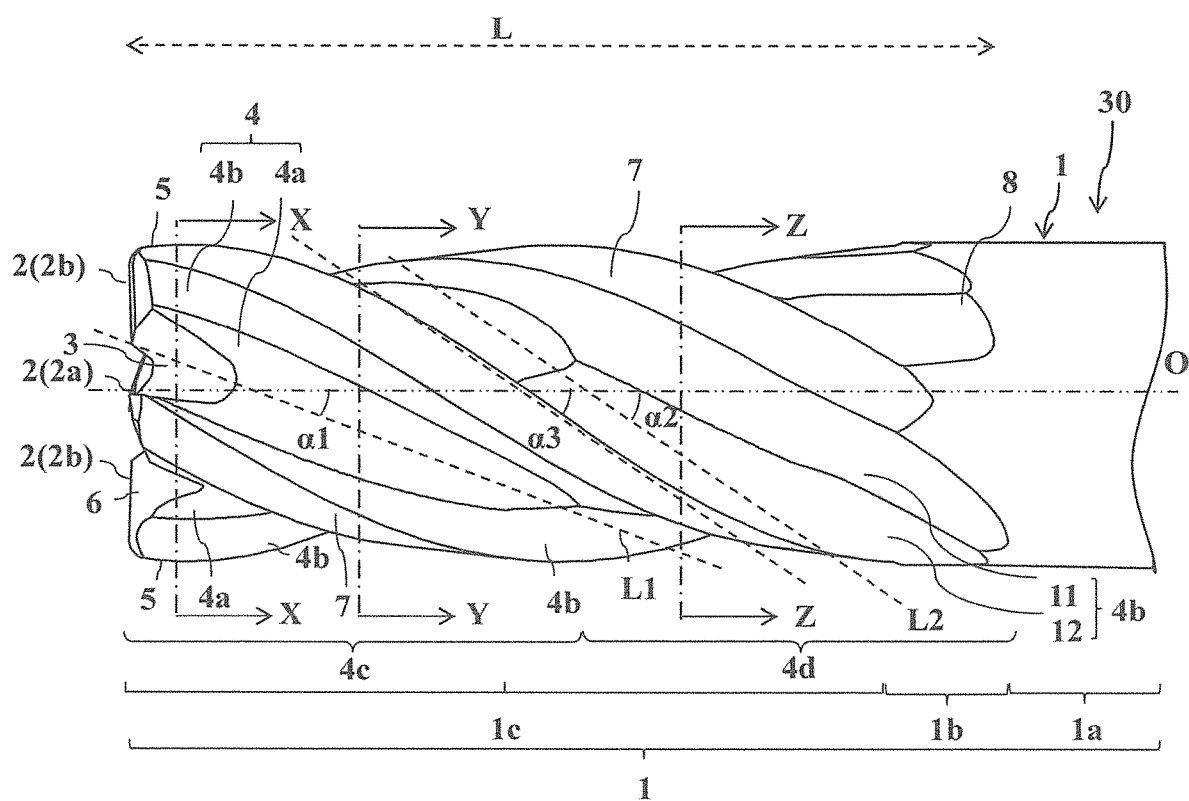
FIG. 2 is an enlarged view at a side of a first end of the end mill illustrated in FIG. 1.

The flute 4 made up of the first flute 4a and the second flute 4b is located on the outer periphery of the body 1. Therefore, when there exists a plurality of the first cutting edges 2, for example, the flutes 4 are respectively located between the second cutting edges 5 as illustrated in FIG. 2. The second cutting edges 5 and the flutes 4 are alternately located on the outer periphery of the body 1 as illustrated in FIGS. 5 to 7 that are respectively cross sections orthogonal to the rotation axis O. In addition to the second cutting edges 5 and the flutes 4, a second flank surface 7 is located on the outer periphery of the body 1. Besides these, a margin part whose distance from the rotation axis O is identical to that of the second cutting edge 5 may be located on the body 1.

Figure 3:
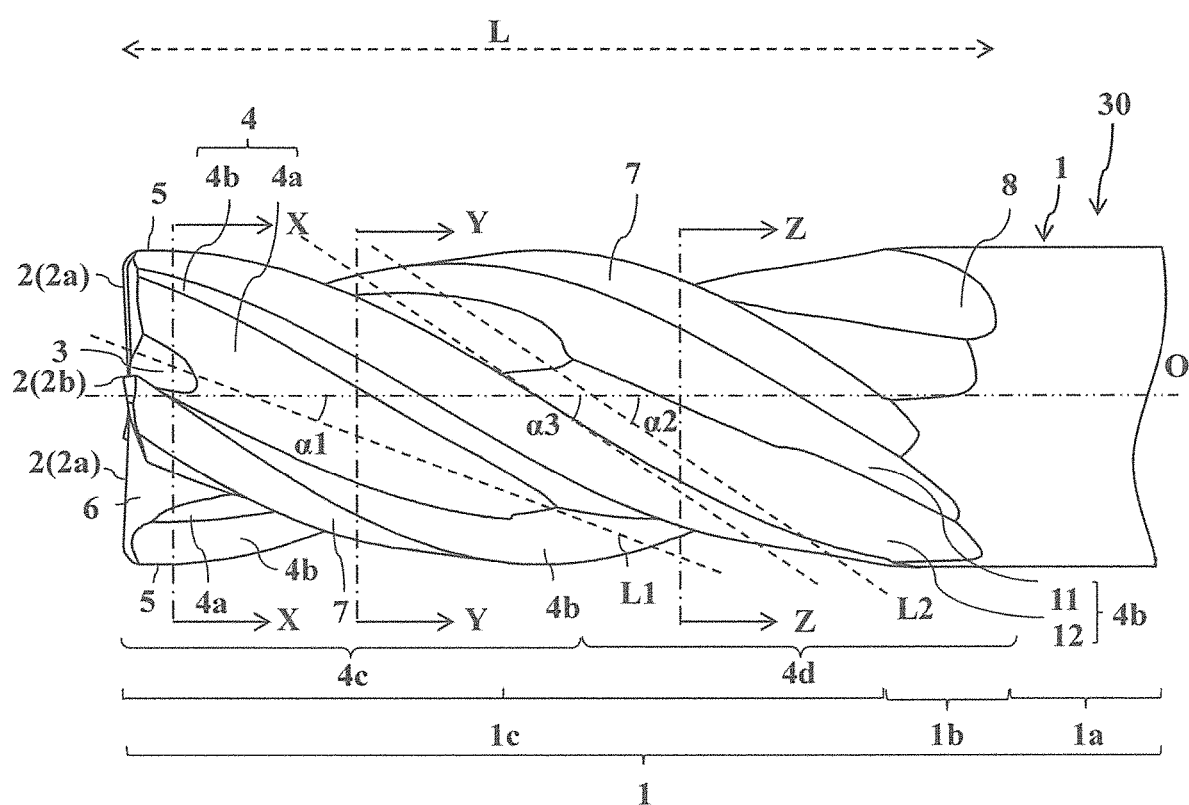
FIG. 3 is a side view when the end mill illustrated in FIG. 2 is rotated 90°.

Each of the flutes 4 extends spirally from the cutting edge part 1c to the root part 1b in the body 1. As illustrated in FIGS. 2 and 3, the flute 4 includes a raised part 8 located at the root part 1b. A depth of the raised part 8 decreases toward a side of the second end B.

As illustrated in FIG. 4, the flutes 4 are respectively located from the first cutting edges 2 to a front side in the rotation direction R of the end mill 30 when viewed toward the first end A. A heel 9 is located at a position opposite to the second cutting edge 5 (an outermost point of the first cutting edge 2) in the flute 4. In other words, the second cutting edge 5 and the heel 9 are located so as to hold the flute 4 therebetween. Here, the second cutting edge 5 is located at a rear side in the rotation direction R, and the heel 9 is located at a front side in the rotation direction R with reference to the flute 4.

A first flank surface 10 is located at a rear side in the rotation direction R with respect to the first cutting edge 2. A terminal end of the second flank surface 7, which is opposed to the second cutting edge 5 with the flute 4 of the body 1 interposed therebetween, is defined as the heel 9 in the present embodiment. As illustrated in FIGS. 5 to 7, the heel 9 is illustrated by an intersection point of the second flank surface 7 and the flute 4 in the cross section orthogonal to the rotation axis O.

In the present embodiment, a ratio of a length of the member 4c to the diameter D of the body 1, in other words, a ratio of a length of the first flute 4a in a direction along the rotation axis O to the diameter D of the body 1 is settable from 1 to 1.6. When the above ratio is settable from 1 to 1.6, it is possible to enhance both the chip discharge performance in the grooving process and the rigidity of the body 1 in the shouldering process.

The depth t1 of the first flute 4a is smaller at a side of the second end B than at a side of the first end A in the present embodiment. When the first flute 4a has the above configuration, the cutting process can be carried out more suitably in both the grooving process and the shouldering process. It is possible to increase the depth of the first flute 4a at the side of the first end A where chips are apt to be caught up in the grooving process. It is also possible to decrease the depth of the first flute 4a at the side of the second end B which is susceptible to a large load in the shouldering process.

Particularly, the depth t1 of the first flute 4a decreases from the side of the first end A toward the side of the second end B in the present embodiment. When the first flute 4a has the above configuration, chip discharge performance is improved because chips in the first flute 4a are easy to smoothly flow to the side of the second end B. The chips are less likely to be caught up because a large step is less likely to occur between the first flute 4a and the second flute 4b on an end portion at the side of the second end B in the first flute 4a. Particularly, when the first flute 4a and the second flute 4b are adjacent to each other without any step in the end portion at the side of the second end B in the first flute 4a, good chip discharge performance is attainable.

Besides the first flute 4a and the second flute 4b, for example, another region may be located as the flute 4 between the first flute 4a and the second flute 4b. In the present embodiment, the first flute 4a is adjacent to the second flute 4b, and the flute 4 is made up of the first flute 4a and the second flute 4b. When the flute 4 is configured as described above, it is possible to ensure a large space for the first flute 4a and the second flute 4b.

In the present embodiment, a depth of the second flute 4b at a point closer to a side of the second end B than the first flute 4a, in other words, at the member 4d is constant, or alternatively decreases from a side of the first end A toward a side of the second end B. In cases where the depth decrease from the side of the first end A toward the side of the second end B, chip discharge performance at the first cutting edge 2 and the second cutting edge 5 can be further enhanced when an inclination of the depth of the second flute 4b is more gentle than an inclination of the depth of the first flute 4a. The inclination of the depth of the first flute 4a is indicated by a value (tan θ) obtained by dividing a difference between a depth on the end portion at the side of the first end A in the first flute 4a and a depth on the end portion at the side of the second end B in the first flute 4a by a length of the first flute 4a. The inclination of the depth of the second flute 4b is obtainable in a similar manner.

In the present embodiment, a helix angle α1 of the first flute 4a is smaller than a helix angle α2 of the second flute 4b. In cases where the helix angle of each of the first flute 4a and the second flute 4b is configured as described above, the chip discharge performance against chips generated at the first cutting edge 2 can be enhanced without impairing the chip discharge performance against chips generated at the second cutting edge 5. Specifically, even though a region between the second cutting edge 5 and the first flute 4a functions as a rake surface of the second cutting edge 5, setting can be made so that a state of the rake surface does not become different as much as possible between a side of the first end A and a side of the second end B, thus leading to a stable cutting performance of the second cutting edge 5.

Here, the helix angle α1 of the first flute 4a is defined by an angle formed by a straight line L1 along a deepest flute bottom in the first flute 4a and the rotation axis O. The helix angle α2 of the second flute 4b is defined by an angle formed by a straight line L2 along a deepest flute bottom in the second flute 4b and the rotation axis O. The helix angle α1 of the first flute 4a is 33-40°, and the helix angle α2 of the second flute 4b is 30-37°.

In the present embodiment, the helix angle α3 of the second cutting edge 5 is identical to the helix angle α2 of the second flute 4b, namely 30-37°. When the angle falls within this range, a force of a cutting resistance exerted in the direction orthogonal to the rotation axis O becomes small, thereby making it possible to reduce a load exerted on the end mill 30. A spacing (distance) "w" between the second cutting edges 5 and 5 adjacent to each other when viewed from a side of the first end differs depending on the number of the second cutting edges 5. For example, the distance "w" is 0.25-0.5 times the diameter D of the end mill 30.

In the present embodiment, a width of the first flute 4a decreases toward the second end in a side view. When the first flute 4a has the above configuration, it is easy to stably ensure a part of the second flute 4b which is adjacent to the second cutting edge 5, namely, the part of the second flute 4b functioning as the rake surface of the second cutting edge 5, in both the member 4c and the member 4d. This leads to a stable cutting performance at the second cutting edge 5.

A width of a part of the second flute 4b which is located between the second cutting edge 5 and the first flute 4a is constant. A width of a part of the second flute 4 which is located between the second cutting edge 5 and the heel 9 increases from a side of the first end A toward a side of the second end B. In other words, the width of the part of the second flute 4b which is located at a more outer peripheral side than the first flute 4a on the rear side in the rotation direction R is constant, and the width of the part of the second flute 4b which is located at a more outer peripheral side than the first flute 4a on the front side in the rotation direction R increases toward the second end B.

When the second flute 4b has the above configuration, setting can be made so that a width of the part of the second flute 4b, functioning as the rake surface of the second cutting edge 5, at a side of the first end A is identical to that at a side of the second end B. This leads to the stable cutting performance of the second cutting edge 5. In the present embodiment, the phrase that the width of the part of the second flute 4b functioning as the rake surface of the second cutting edge 5 is constant denotes that variations in the width of this part is within 10%.

As illustrated in FIGS. 2, and 7, the second flute 4b is made up of two concave curved surface shaped flute parts 11 and 12 adjacent to each other in a cross section orthogonal to the rotation axis O at a point closer to a side of the second end B than the first flute 4a. When the second flute 4b has the above configuration, it is easy to adjust a rake angle at a side of the second cutting edge 5 while optimizing a capacity of the flute 4. These two flute parts 11 and 12 are distinguishable by a difference in states (orientation and shape) of machining marks. The two flute parts 11 and 12 may smoothly connect to each other, or alternatively a protrusion 13 may be interposed therebetween. The flute 4 made up of the two flute parts 11 and 12 is formable by carrying out the grooving process at least two times with respect to the body 1 in a manufacturing process.

The end mill 30 of the present embodiment includes the four first cutting edges 2 as illustrated in FIG. 4. Here, each of the four first cutting edges 2 is made up of two first cutting edges 2 (hereinafter referred to as first members 2a) which pass through the rotation axis O and are mutually located in a rotation symmetrical manner, and two first cutting edges 2 (hereinafter referred to as second members 2b) which are spaced away from the rotation axis O and mutually located in a rotation symmetrical manner. That is, the end mill 30 of the present embodiment is designed to include the four or more first cutting edges 2 including the two first members 2a and the two second members 2b. In general, the first members 2a are members referred to as long cutting edges, and the second members 2b are members referred to as short cutting edges.

In the present embodiment, a depth t1p of the first flute 4a extending from the first member 2a is greater than a depth t1c of the first flute 4a extending from the second member 2b in the cross section orthogonal to the rotation axis O. When the first flute 4a has the above configuration, chip discharge performance at the first member 2a can be enhanced while maintaining the rigidity of the body 1. The first member 2a has a greater cutting edge length than the second member 2b, thereby generating a large amount of chips. Therefore, a part of the first flute 4a which permits passage of chips generated by the first member 2a needs to have a greater capacity of the flute 4 than a part of the first flute 4a which permits passage of chips generated by the second member 2b.

In cases where there exists a plurality of first cutting edges 2, instead of employing the configuration including the first member 2a and the second member 2b as in the present embodiment, it is possible to perform an unequal division so that at least one of the first cutting edges 2 does not have a point-symmetric shape with respect to another first cutting edge 2. When at least one first cutting edge 2 has an asymmetric shape with respect to another first cutting edge 2, the end mill 30 is less likely to resonate and cause chatter vibration during cutting off.

As a configuration for reducing the chatter vibration, besides the asymmetric arrangement of the first cutting edges 2 as described above, it is possible to employ such a configuration that some of the first cutting edges 2 and the subsequent second cutting edge 5 do not have the same opening angle (unequal division), or alternatively such a configuration that they do not have the same helix angle α3.

Although depending on the number of the first cutting edges 2, a desirable range of each of opening angles β1 and β2 of the flutes 4 illustrated in FIG. 6 is 30-165°. When falling within this range, no chip clogging may occur in the flutes 4, and chips are less likely to fly out without being curled by the flutes 4.

The opening angles β1 and β2 of the flutes 4 are defined in FIG. 6 by a straight line connecting the second cutting edge 5 and the rotation axis O, and a straight line connecting the heel 9 and the rotation axis O. In FIGS. 5 to 7, the opening angle β1 with respect to the second cutting edge 5 being continuous with the first member 2a is different from the opening angle β2 with respect to the second cutting edge 5 being continuous with the second member 2b.

The end mill 30 of the present embodiment makes it possible to recover the cutting edges by regrinding. Specifically, the first cutting edge 2 and the second cutting edge 5 can be recovered by a regrinding process on the flutes 4 and a regrinding process on the gash 3 of the rake surface 6. On this occasion, the flutes 4 are preferably optimized by also reworking the first flute 4a depending on the case.

<Method of Manufacturing Machined Product>

A method of manufacturing a machined product in the present embodiment is described below with reference to FIGS. 8 and 9.

Figure 8A:
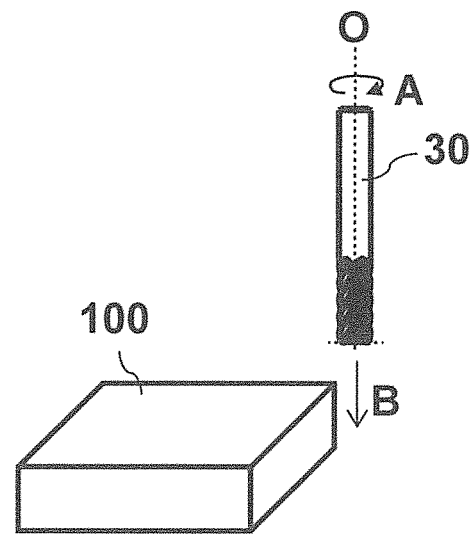
FIG. 8 is a schematic diagram illustrating a method of manufacturing a machined product in a first embodiment.

FIG. 8 is a schematic diagram illustrating, as a first embodiment, a method of manufacturing a machined product which is intended to perform a shouldering process on a workpiece by using the end mill in FIG. 1. In the present embodiment, the end mill 30 is brought near the workpiece 100 by moving the end mill 30 in an arrow B direction while rotating the end mill 30 in an arrow A direction with reference to the rotation axis O as illustrated in FIG. 8A.

Figure 8B:
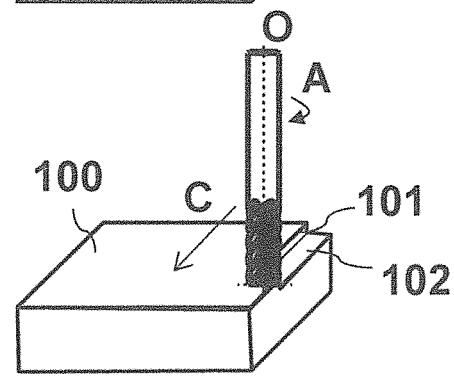

Subsequently, the end mill 30 being rotated is brought into contact with the workpiece 100 as illustrated in FIG. 8B. Specifically, the first cutting edge and the second cutting edge are brought into contact with a surface of the workpiece 100 by moving the end mill 30 being rotated in an arrow C direction that is a direction vertical to the rotation axis O. A cut-off surface of the workpiece 100 after being cut off by being brought into contact with the second cutting edge becomes a side cut-off surface 101. A cut-off surface of the workpiece 100 after being cut off by the first cutting edge becomes a bottom cut-off surface 102.

Figure 8C:
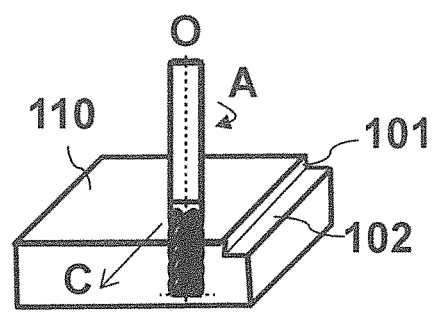

As illustrated in FIG. 8C, a desired machined product 110 is obtainable by moving the end mill 30 as it is in an arrow C direction so as to move the end mill 30 away from the workpiece 100 when the cutting process is terminated. The machined product 110 with excellent machining surface accuracy is obtainable because the end mill 30 has the excellent cutting performance in the shouldering process for the reasons described above.

When the cutting process is continued, it is necessary to repeat the step of bringing the cutting edges of the end mill 30 into contact with different portions of the workpiece 100 while keeping the end mill 30 rotating. Although the end mill 30 is brought near the workpiece 100 in the present embodiment, the end mill 30 and the workpiece 100 need to be relatively brought near. For example, the workpiece 100 may be brought near the end mill 30. This is also true for the step of moving the end mill 30 away from the workpiece 100.

FIG. 9 is a schematic diagram illustrating, as a second embodiment, a method of manufacturing a machined product which is intended to perform a grooving process on a workpiece by using the end mill in FIG. 1. As illustrated in FIG. 9A, the end mill 30 is brought near the workpiece 100 in the present embodiment as in the case of FIG. 8A.

Figure 9A:
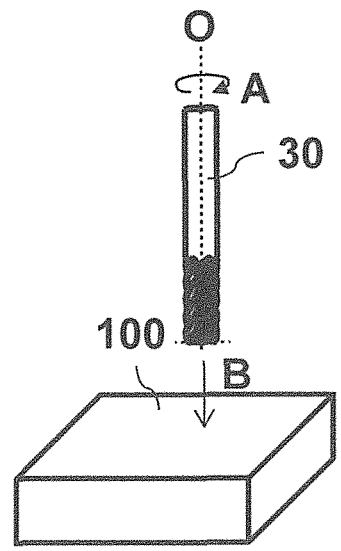
FIG. 9 is a schematic diagram illustrating a method of manufacturing a machined product in a second embodiment.
Figure 9B:
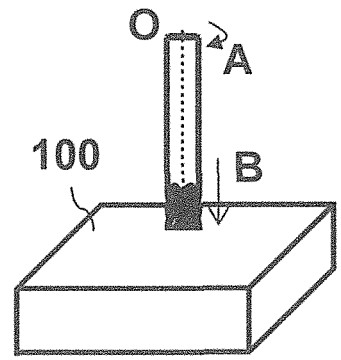
Figure 9C:
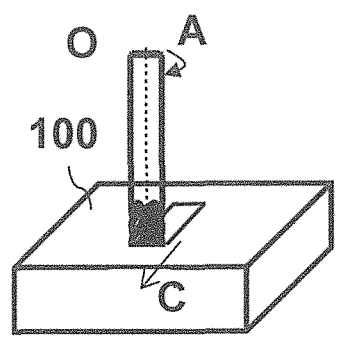

Subsequently, the end mill 30 being rotated is brought into contact with a surface of the workpiece 100 as illustrated in FIGS. 9B and 9C. Specifically, as illustrated in FIG. 9B, the first cutting edge and the second cutting edge are brought into contact with the surface of the workpiece 100 by moving the end mill 30 being rotated in an arrow B direction that is a direction parallel to the rotation axis O. Then, the first cutting edge and the second cutting edge are brought into contact with the surface of the workpiece 100 by moving the end mill 30 in an arrow C direction that is a direction vertical to the rotation axis O. Consequently, a cut-off surface of the workpiece 100 after being cut off by being brought into contact with the first cutting edge becomes a bottom cut-off surface 103. A cut-off surface of the workpiece 100 after being cut off by the second cutting edge becomes a side cut-off surface 104.

Figure 9D:
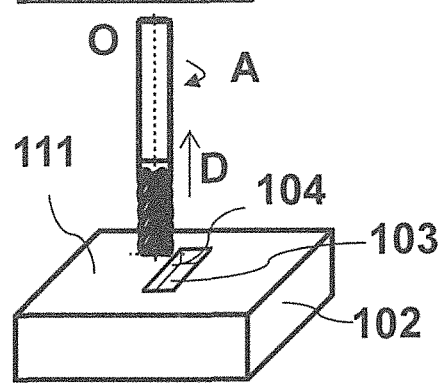

As illustrated in FIG. 9D, a desired machined product 111 is obtainable by moving the end mill 30 in D direction opposite to the arrow B direction so as to move the end mill 30 away from the workpiece 100 when the cutting process is terminated. The machined product 110 with excellent machining surface accuracy is obtainable because the end mill 30 also has the excellent cutting performance in the grooving process for the reasons described above. It is also possible to carry out a cutting process with a combination of the shouldering process and the grooving process.

While the end mill in the embodiment and the method of manufacturing a machined product using the end mill have been described and illustrated above, the present invention is not limited to the foregoing embodiments. It is, of course, possible to make any arbitrary ones insofar as they do not depart from the gist of the present invention.

DESCRIPTION OF REFERENCE NUMERALS 30 end mill
1 body
  1a shank part
  1b root part
  1c cutting edge part
2 first cutting edge
  2a first member
  2b second member
3 gash
4 flute
  4a first flute
  4b second flute
5 second cutting edge
6 rake surface
7 second flank surface
8 raised part
9 heel
10 first flank surface
11, 12 flute part
13 protrusion
O rotation axis
D diameter of end mill
α helix angle
β opening angle
d core thickness

What is claimed is:

1. An end mill, comprising:
a bar-shaped body extending from a first end to a second end along a rotation axis;

a cutting edge located at a side of the first end of the body;
a gash located adjacent to the cutting edge;
a first flute surrounding the gash and spirally extending from the gash toward the second end; and
a second flute surrounding the first flute and spirally extending from the first flute toward the second end, wherein
a depth of the first flute is greater than a depth of the second flute in a cross section orthogonal to the rotation axis, and
the second flute comprises two adjacent flute parts located closer to the second end than the first flute and having a concave curved surface shape in a cross section orthogonal to the rotation axis.

2. The end mill according to claim 1, wherein a ratio of a length of the first flute in a direction along the rotation axis to a diameter of the body is from 1 to 1.6.

3. The end mill according to claim 1, wherein
the first flute comprises:
a third end located closest to the first end of the body, and
a fourth end located closest to the second end of the body; and
the depth of the first flute at the fourth end is smaller than the depth of the first flute at the third end.

4. The end mill according to claim 3, wherein the depth of the first flute decreases from the side of the first end toward the side of the second end.

5. The end mill according claim 1, wherein
the second flute comprises a first part located closer to the second end than the first flute, and
a depth of the first part is constant or decreases from a side of the first end toward a side of the second end.

6. The end mill according to claim 1, wherein a helix angle of the first flute is smaller than a helix angle of the second flute.

7. The end mill according to claim 1, wherein a width of the first flute decreases toward the second end in a side view.

8. The end mill according to claim 7, wherein
the second flute comprises:
a rear part located rearward of the first flute in the rotation direction, and
a front part located forward of the first flute in the rotation direction;
a width of the rear part is constant; and
a width of the front part increases toward the second end.

9. A method of manufacturing a machined product, comprising:
rotating an end mill according claim 1;
bringing the end mill being rotated into contact with a workpiece; and
moving the end mill away from the workpiece.

10. The end mill according to claim 1, wherein
the cutting edge comprises four or more members comprising two first members which pass through the rotation axis and are mutually located in a rotation symmetrical manner, and two second members which are spaced away from the rotation axis and mutually located in a rotation symmetrical manner in an end surface view from the side of the first end; and
a depth of the first flute extending from the first member is greater than a depth of the first flute extending from the second member in a cross section orthogonal to the rotation axis.

11. An end mill, comprising:
a bar-shaped body extending from a first end to a second end along a rotation axis:
a cutting edge located at a side of the first end of the body;
a gash located adjacent to the cutting edge;
a first flute surrounding the gash and spirally extending from the gash toward the second end; and
a second flute surrounding the first flute and spirally extending from the first flute toward the second end, wherein
a depth of the first flute is greater than a depth of the second flute in a cross section orthogonal to the rotation axis;
the cutting edge comprises four or more members comprising two first members which pass through the rotation axis and are mutually located in a rotation symmetrical manner, and two second members which are spaced away from the rotation axis and mutually located in a rotation symmetrical manner in an end surface view from the side of the first end; and
a depth of the first flute extending from the first member is greater than a depth of the first flute extending from the second member in a cross section orthogonal to the rotation axis.

12. The end mill according to claim 11, wherein a ratio of a length of the first flute in a direction along the rotation axis to a diameter of the body is from 1 to 1.6.

13. The end mill according to claim 11, wherein
the first flute comprises:
a third end located closest to the first end of the body, and
a fourth end located closest to the second end of the body; and
the depth of the first flute at the fourth end is smaller than the depth of the first flute at the third end.

14. The end mill according to claim 13, wherein the depth of the first flute decreases from the side of the first end toward the side of the second end.

15. The end mill according claim 11, wherein
the second flute comprises a first part located closer to the second end than the first flute, and
a depth of the first part is constant or decreases from a side of the first end toward a side of the second end.

16. The end mill according to claim 11, wherein a helix angle of the first flute is smaller than a helix angle of the second flute.

17. The end mill according to claim 11, wherein a width of the first flute decreases toward the second end in a side view.

18. The end mill according to claim 17, wherein
the second flute comprises:
a rear part located rearward of the first flute in the rotation direction, and
a front part located forward of the first flute in the rotation direction;
a width of the rear part is constant; and
a width of the front part increases toward the second end.

19. A method of manufacturing a machined product, comprising:
rotating an end mill according claim 11;
bringing the end mill being rotated into contact with a workpiece; and
moving the end mill away from the workpiece.

* * * * *